United States Patent [19]

Martin, Jr.

[11] 4,339,506

[45] Jul. 13, 1982

[54] DIFFUSION RESISTANT RUBBER LINER AND LAMINATES FORMED THEREFROM

[75] Inventor: Theodore O. Martin, Jr., Wadsworth, Ohio

[73] Assignee: Chloeta F. Martin, Wadsworth, Ohio

[21] Appl. No.: 224,384

[22] Filed: Jan. 12, 1981

[51] Int. Cl.³ ............... B32B 25/04; B32B 25/14; B32B 25/16
[52] U.S. Cl. ................................ 428/519; 428/521
[58] Field of Search ............. 428/419, 466, 492, 493, 428/519, 521

[56] References Cited

U.S. PATENT DOCUMENTS

| | | | |
|---|---|---|---|
| 2,167,716 | 8/1939 | Harkins | 428/466 |
| 2,522,135 | 9/1950 | Schaffer | 428/466 |
| 2,522,137 | 9/1950 | Schaffer | 428/466 |
| 2,522,138 | 9/1950 | Schaffer | 428/466 |
| 4,115,614 | 9/1978 | Martin, Jr. | 428/519 |
| 4,215,178 | 7/1980 | Martin, Jr. | 428/521 |

*Primary Examiner*—William J. Van Balen
*Attorney, Agent, or Firm*—Oldham, Oldham, Hudak & Weber Co.

[57] ABSTRACT

A rubber liner having resistance to fluid diffusion is disclosed. The rubber liner is compounded from natural or synthetic rubber in combination with a thiuram compound such that the blend upon curing has a durometer hardness no greater than about 75 on the Shore D. Scale. The rubber liner may be combined with a heat-resistant rubber layer to form a rubber laminate resistant to heat and fluid diffusion. The heat-resistant rubber layer may be composed of natural or synthetic rubber in combination with a salt of a benzimidazole which resists oxidation at elevated temperature over extended time periods with a retention or increase tensile strength. The rubber laminate may also have a metal-adhesive rubber layer to secure the laminate to metal substrates of industrial production tanks, vessels, pipes, and other containers where industrial processing continually exceeds 180° F. The use of a rubber liner having diffusion resistant properties with a durometer hardness less than 75 on the Shore D Scale resists structural weaknesses developed upon continuous exposure to temperatures of about 180° F.

19 Claims, 4 Drawing Figures

DIFFUSION RESISTANT RUBBER LINER AND LAMINATES FORMED THEREFROM

TECHNICAL FIELD

This invention relates to rubber laminates resistant to heat and fluid diffusion, and individual rubber lining compositions comprising the rubber laminate.

BACKGROUND ART

Heretofore, linings for industrial surfaces transferring or holding corrosive material have typically included rubber liners in a multi-layer form. These rubber laminates have been compounded to prevent the corrosive material from reacting with the typically metal storage tank or transfer pipe. In the industrial production of corrosive acids such as phosphoric acid, diffusion of fluids through the rubber liner creates pockets of corrosion between the liner and the metal pipe or tank, which causes a corrosive delamination and bursting of the liner or the entire laminate. The entire protective features of the rubber laminate are lost upon this corrosive destruction, and industrial production is halted while the entire tank or pipe is replaced.

U.S. Pat. No. 4,215,178, granted to this inventor, and the references cited therein, as well as U.S. Pat. No. 4,115,614 granted to this inventor, and the references cited therein, describe the general state of the art for a variety of rubber laminates serving to protect tanks, pipes, reactors, and other vessels.

However, it has been found that these various rubber laminates used in the art do not provide adequate resistance to fluid diffusion and fail especially at processing temperatures which exceed 185° Fahrenheit. In the production of phosphoric acid, a greater concentration of phosphoric acid or a greater volume of phosphoric acid production may be achieved when the processing temperatures exceed 185° Fahrenheit and approach 220° Fahrenheit. Rubber laminates presently known in the art are incapable of resisting fluid diffusion at such higher processing temperatures. Therefore, the need exists for a rubber liner capable of resisting fluid diffusion while serving as a protective lining for tanks, pipes, and other vessels. The need also exists for a rubber laminate resistant to heat degradation to protect that section of the laminate which resists fluid diffusion.

DISCLOSURE OF INVENTION

It is an object of the invention to provide a rubber liner resistant to fluid diffusion wherein the rubber liner is compounded with a concentration of curing agents sufficient to limit the curing of the rubber liner to a durometer hardness of less than about 75 on the Shore D Scale.

It is another object of the invention to provide a rubber liner resistant to fluid diffusion, wherein the rubber liner is uncured when installed upon the pipe, tank, or other vessel and cures to a durometer hardness of no greater than about 75 on the Shore D Scale.

Another object of the invention is to provide a rubber liner which is resistant to fluid diffusion thereby maintaining protection of the pipe, tank, or other vessel during industrial processing at temperatures in excess of 185° Fahrenheit from the degrading effect of corrosive materials upon the tank, pipe, or other vessel.

It is yet another object of the invention to provide a rubber liner resistant to fluid diffusion which may be laminated to other liners assisting in the resistance to heat and other degrading effects caused by passage of corrosive material at elevated temperatures for extended periods of time.

It is another object of the invention to provide a rubber liner resistant to fluid diffusion which may be laminated to other liners assisting in the resistance to heat and other degrading effects including attack by oil based anti-foaming agents.

It is moreover an object of the invention to provide a rubber laminate resistant to heat and fluid diffusion, wherein the curing of the diffusion-resistant liner to a durometer hardness of less than about 75 on the Shore D Scale prevents a rupture of the entire rubber laminate, and wherein the heat resistant liner prevents oxidative degradation of the rubber laminate.

The objects of the invention are achieved by a rubber liner resistant to fluid diffusion, comprising: a composition, having upon curing, a durometer hardness of from about 15 to about 75 on the Shore D Scale, said blend comprising (a) about 100 parts by weight of a rubber elastomer selected from the group consisting of (1) natural rubber, (2) a polymer made from diene monomers having from 4 to 12 carbon atoms, (3) a copolymer made from diene monomers having from 4 to 12 carbon atoms, and (4) a copolymer made from vinyl substituted aromatic monomers having from 8 to 12 carbon atoms and diene monomers having from 4 to 12 carbon atoms; and (b) from about 1 part to about 4 parts by weight of a thiuram compound having the following formula:

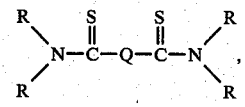

where R is hydrogen or alkyl group having from 1 to 6 carbon atoms and where Q is selected from the group of thio radicals consisting of —S—, —S—S—, and combinations thereof; whereby said composition resists structural cracking under continuous exposure to temperatures above about 180° F.

The objects of the invention are also achieved by a rubber laminate resistant to heat and fluid diffusion, comprising: a heat resistant rubber layer and a diffusion-resistant rubber layer; said diffusion-resistant layer comprising a composition having, upon curing, a durometer hardness of from about 15 to about 75 on the Shore D Scale, said composition comprising (a) about 100 parts by weight of a rubber elastomer selected from the group consisting of (1) natural rubber, (2) a polymer made from diene monomers having from 4 to 12 carbon atoms, (3) a copolymer made from diene monomers having from 4 to 12 carbon atoms, and (4) a copolymer made from vinyl substituted aromatic monomers having from 8 to 12 carbon atoms and diene monomers having from 4 to 12 carbon atoms; (b) from about 1 part to about 4 parts by weight of a thiuram compound having the following formula:

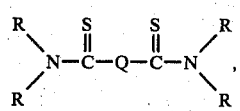

where R is hydrogen or an alkyl group having 1 to 6 carbon atoms and where Q is selected from the group of thio radicals consisting of —S—, —S—S—, and combinations thereof; whereby said composition resists structural cracking under continuous exposure to temperatures above about 180° F.; said heat resistant layer comprising a blend having less then ten percent (10%) change in percentage elongation after exposure to temperatures of about 212° F. for periods greater than about 70 hours, said blend comprising (1) about 100 parts by weight of a rubber elastomer selected from the group consisting of (a) natural rubber, (b) a polymer made from diene monomers having from 4 to 12 carbon atoms, (c) a copolymer made from diene monomers having from 4 to 12 carbon atoms, and (d) a copolymer made from vinyl substituted aromatic monomers having from 8 to 12 carbon atoms and diene monomers having from 4 to 12 carbon atoms, (e) homopolymers made from chloro-substituted diene monomers having from 4 to 12 carbon atoms, (f) copolymers made from cyano-substituted olefin monomers having from 2 to 8 carbon atoms and diene monomers having from 4 to 12 carbon atoms; and (2) about 1 part by weight of a salt of a benzimidazole having the following formula:

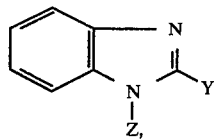

where Y is selected from the group of radicals consisting of hydrogen and mercapto and where Z is selected from the group of radicals consisting of hydrogen and alkyl groups having from 1 to 6 carbon atoms; whereby said heat resistant layer resists oxidation at elevated temperatures over extended time periods to retain or increase its tensile strength.

BRIEF DESCRIPTION OF DRAWINGS

For a greater understanding of the application of the diffusion-resistant rubber liner and the rubber laminates formed therewith, including the heat-resistant rubber liner, reference is made to the illustrative drawings; wherein.

BEST MODE FOR CARRYING OUT THE INVENTION

According to the concepts of the present invention, a rubber liner resistant to fluid diffusion must be capable of withstanding continual exposure to elevated temperatures for extended periods of time. For the diffusion-resistant rubber liner to be effective, according to the concepts of the present invention, the rubber liner must prevent diffusion of fluids to form pockets of corrosion between the rubber laminate and the metal substrate. A rubber liner which is diffusion resistant must be resistant to structural cracking of its composition upon exposure to elevated temperatures for continuous periods of time. By limiting the concentration of curing agents, the maximum cure of the rubber liner resistant to fluid diffusion does not exceed the point where the durometer hardness of the rubber composition exceeds about 75 on the Shore D Scale. It has been found by the inventor that structural integrity of the rubber liner is maintained when the durometer hardness of the rubber composition is less than about 75 on the Shore D Scale upon curing of the blend.

Figure 1:
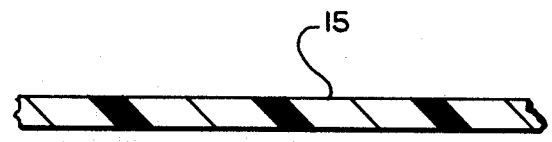
FIG. 1 is a cross sectional view of a rubber elastomer liner resistant to diffusion, according to the present invention.
Figure 3:
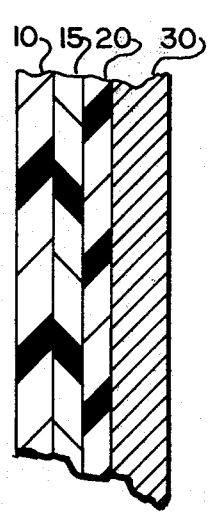
FIG. 3 is a cross-sectional view showing the laminate of the present invention applied to a straight metal substrate.
Figure 4:
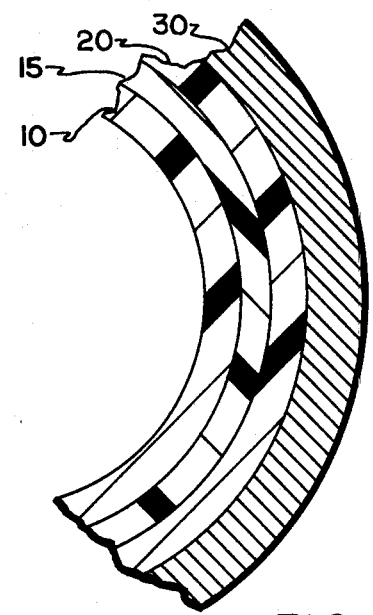
FIG. 4 is a cross-sectional view showing the laminate applied to a curved metal substrate.

The rubber liner of the present invention resistant to fluid diffusion is indicated by the number 15 as seen in FIG. 1. The cross-sectional rubber laminate 11 in which rubber liner 15 is a component may be seen in FIG. 2 and the applications of the laminate to straight and curved metal substrates as seen in FIGS. 3 and 4, respectively.

The rubber liner 15 can generally be prepared from any type of rubber elastomer which resists diffusion and may be limited by other compounds to a cure less than about a durometer hardness of about 75 on the Shore D Scale. Rubber elastomers for liner 15 include natural rubber, that is cis-1, 4-polyisoprene obtained from "rubber trees," various homopolymers or interpolymers such as copolymers made from diene monomers, containing from 4 to 12 carbon atoms, and various copolymers made from vinyl substituted aromatic monomers containing from 8 to 12 carbon atoms and the diene monomers containing from 4 to 12 carbon atoms. Specific examples of diene monomers include isoprene (that is containing both cis and trans isomers), butadiene, piperylene, hexadiene, heptadiene, octadiene, decadiene, dodecadiene, 2,3-dimethyl-1,3-butydiene, 2-methyl-1, 3-pentadiene, 3,4-dimethyl-1,3-hexadiene, 4,5-diethyl-1,3-octadiene, 3-butyl-1,3-octadiene and the like. Preferred monomers include isoprene, and butadiene. An example of a homopolymer of diene monomers is cis-1, 3-polyisoprene (synthetic natural rubber). Examples of various copolymers made from said dienes include butadiene-isoprene, piperylene-isoprene, butadiene-hexadiene, and the like.

Examples of specific vinyl substituted aromatic monomers include styrene, alpha-methylstyrene, ortho-, para-, and meta-methyl, ethyl styrenes, and the like. Specific examples of copolymers containing vinyl substituted aromatic monomers include styrene-butadiene (SBR), styrene-isoprene, alpha-methylstyrene-butadiene and the like. A desirable copolymer is styrene-butadiene. The highly preferred rubber elastomer is natural rubber, that is cis-1,4-polyisoprene. Generally, the number average molecular weight of the rubber elastomer in liner 15 may range from about 10,000 to about 500,000 with a range of from about 100,000 to about 400,000 being preferred.

Based upon 100 parts by weight of said rubber elastomer, from about 1 to about 4, desirably from about 2 to about 4, and preferably about 2.5 parts by weight of a thiuram compound is added. The thiuram compound is defined to be that group of compounds having the following formula:

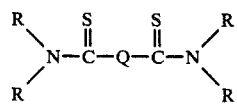

where R is hydrogen or an alkyl group having from 1 to 6 carbon atoms, and where Q is selected from the group of thio radicals consisting of —S—, —S—S—, and combinations thereof. Examples of thiuram compounds include tetramethyl thiuram monosulfide, tetramethyl thiuram disulfide, tetraethyl thiuram monosulfide, and tetraethyl thiuram disulfide. Of the compounds having the above described formula, tetramethyl thiuram disulfide and tetramethyl thiuram monosulfide are desirable, and tetramethyl thiuram monosulfide (TMTM) is preferred.

In addition to the rubber elastomer and the thiuram compound, other ingredients may be added to the rubber liner composition. It has been found that from about 30 parts to about 60 parts by weight of sulfur and from about 5 parts by weight to about 15 parts by weight of zinc oxide aid in the processing and curing of the rubber liner 15. Preferably, about 50 parts of sulfur and about 8 parts by weight of zinc oxide may be added. Finally, about 0.2 parts by weight of a peptizer may be added to the blend for rubber lining 15 to aid in processing. The peptizer is available by the commercial name of Pepton, a powder peptizer produced by American Cyanamide.

In addition to the above-identified compounds which, when mixed with the rubber elastomer, yield a rubber liner having diffusion resistance, desirable amounts of various conventional compounds or compounding agents may be added to the rubber to improve its physical properties as is known in the art. For example, carbon black, silica, various clays, waxes and fibers may be utilized along with a host of other compounds such as fillers, antioxidants, anti-ozonants, accelerators, processing agents, and the like. In addition to a curing agent such as sulfur, organic peroxides may be added in sufficient amounts to cure the rubber upon heating. However, control of the concentration of the thiuram compound is necessary to limit the durometer hardness to about 75 on the Shore D Scale.

Once the rubber elastomer having these various components has been compounded, it is generally mixed on a mill. Mixing on the mill may occur from about 100° to about 180° Fahrenheit. Following mixing, the rubber elastomeric blend is formed into rubber liner 15 on a calendar roll at a temperature from about 125° F. to about 180° F. Various thicknesses may be created for the liner 15 depending upon the particular application. However, it has been found that a thickness from about 0.035 to about 0.100 inches will provide adequate diffusion resistance for the predominant number of applications. Preferably, the thickness is about 0.088 inches for most pipes, tanks, and other vessels in industrial production of phosphoric acid.

The application of rubber liner 15 to a metal substrate will prevent the diffusion of moisture and other corrosive fluids from the phosphoric acid or other corrosive material through the liner 15 to the metal substrate. Moisture and other corrosive materials may diffuse through rubber materials in only one direction. Once the moisture or other corrosive material is trapped between a rubber liner and the metal substrate, with no route for removal, the moisture or other corrosive material will attack the metal substrate. Therefore, continued maintenance of the diffusion resistance in the rubber liner 15 maintains longer production life for the metal substrates forming the tanks, pipes, and other vessels of industrial production of corrosive materials.

Diffusion resistance is seriously weakened by a continual hardening or curing of the rubber liner 15 upon continued exposure to elevated processing temperatures. With production temperatures for phosphoric acid typically around 185° Fahrenheit, the uncured rubber liner 15 is cured continually under these conditions. As the curing and hardening continues, cracks and other structural weaknesses in the rubber liner 15 develop making diffusion of moisture and other corrosive materials more likely to the metal substrate. Therefore, preventing a continual hardening or curing of the rubber liner 15 is necessary to maintain the diffusion resistant characteristics of rubber liner 15 as compounded using materials described above. Regulation of the concentration of the thiuram compound greatly alters the surface structure of the rubber liner 15, by altering the durometer hardness properties of the liner 15.

The rubber liner 15 was prepared according to the following recipe:

TABLE I

RUBBER LINER RECIPES
(Parts by Weight)

| COMPOUNDS | Sample 1 | Sample 2 | Sample 3 | Sample 4 |
|---|---|---|---|---|
| Natural Rubber (constant vicosity 60- premasticated) | 100 | 100 | 100 | 100 |
| Sulfur (spider type) | 50 | 50 | 50 | 50 |
| Zinc Oxide | 8.00 | 8.00 | 8.00 | 8.00 |
| Tetramethyl Thiuram Monosulfide (TMTM) | 0 | 1 | 2 | 4 |
| Pepton (Peptizer from American Cyanamide) | 0.2 | 0.2 | 0.2 | 0.2 |

As shown in Table I, four samples of rubber liner 15 were prepared, with varying amounts of the thiuram compound. Each of the samples were subjected to a temperature of about 212° F. for a constant period of 48 hours. As seen with reference to Table II, below, Sample 1 exhibited 0 Shore D hardness and was too soft for effective resistance. However, progressing from Sample 2 to Sample 4 as seen in Table II, the hardness was in an acceptable range on the Shore D Scale from about 15 to about 75. Adding one part by weight of the thiuram compound formed a rubber liner 15 which was acceptable for diffusion resistance, though at the soft area of the acceptable range. Likewise, Sample 4, yielded a rubber liner 15 within the acceptable range at the hard end of the spectrum.

TABLE II

| | Sample | | | |
|---|---|---|---|---|
| | 1 | 2 | 3 | 4 |
| Durometer Hardness (Shore D Scale) | 0 | 15 | 35 | 75 |

The rubber liner 15 having from 1 to 4 parts of the thiuram compound maintains its diffusion resistance property over extended periods of time and elevated temperatures. Without a controlled durometer hardness property, the rubber liner 15 would continue to cure, weakening its structure and rendering it more susceptible to moisture and corrosive material diffusion than is permitted for industrial processing at temperatures of about 185° F. or greater. It has been found by the inventor that the weakened structure of liner 15 weakens all other layers of a laminate, despite different curing properties. By employing a rubber liner 15 of the present invention, it may be possible to raise temperatures in the reaction vessels, pipes, and tanks of industrial production of phosphoric acid, because the rubber liner 15 of the present invention may maintain its diffusion resistance properties without a weakening structural degradation during constant elevated temperatures and periods of time. At higher temperatures such as about 220° F., greater concentrations of phosphoric acid are produced as well a greater volume of material being processed. The rubber liner 15 of the present invention increases the production efficiency for that industrial process.

As described above, the thiuram compound is mixed with the rubber elastomer, the sulfur, and the zinc oxide. If there is a delay in production between the mixing stage and calendar steps, the thiuram compound should be withheld from the rubber compound during storage and added immediately prior to the calendaring of the rubber compound into rubber liner 15. Whereas the original mixing on the mill occurs for about 30 minutes, the rubber compound is not adversely affected by subsequent mixing of the thiuram compound therein immediately prior to calendaring.

Figure 2:
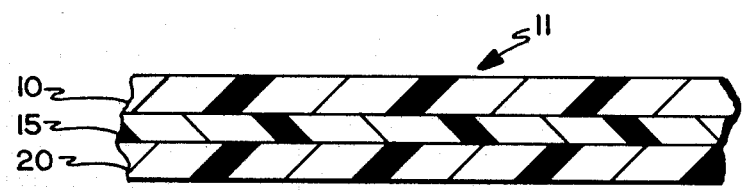
FIG. 2 is a cross-sectional view showing the rubber liner of the present invention as a part of a laminate.

FIG. 2 shows a preferred 3-layer laminate 11. The above-described rubber elastomer blend having the thiuram compound controlling durometer hardness constitutes intermediate or central layer 15. The interior layer 20 is made from any soft rubber material, that is a rubber elastomer which has a Shore A hardness of from about 30 to about 40, with approximately 35 being preferred. The soft layer permits maximum rubber-to-metal adhesion between the laminate 11 and the metal substrate 30, whether straight or curved as seen in FIGS. 3 and 4, respectively. On the opposite side of liner 15 is the exterior liner 10 which is also made from a soft rubber material having a Shore A hardness of from about 30 to about 40, with approximately 35 being preferred. As described below, either layer 10 or layer 20 or both may have particular heat resistant properties suitable for combining with the rubber liner 15 of the present invention to prevent degradation of the overall laminate 11. Laminate 11 may also contain any number of layers in addition to the three layers mentioned, as long as a soft rubber layer creates the rubber-to-metal adhesion. The rubber liner 15 of the present invention provides diffusion resistance, and the soft outer layer 10 prevents direct contact of the corrosive material and its by-product with the rubber liner 15 of the present invention.

While the layers 10 and 20 have been described as any soft rubber material, it has been found by the inventor that the combination of a particular known formulation for layer 10, in combination with the rubber liner 15 of the present invention, provides unexpected improvements to the overall structural integrity of the laminate 11 when subjected to constant temperatures in excess of 185° F. for continuous periods of time in the presence of the corrosive material and its by-products. The rubber elastomer for layer 10 may be any of the rubber elastomers previously described for rubber liner 15 including natural rubber, polymers made from diene monomers having from 4 to 12 carbon atoms, copolymers made from diene monomers having from 4 to 12 carbon atoms, and copolymers made from vinyl substituted aromatic monomers having from 8 to 12 carbon atoms and diene monomers having from 4 to 12 carbon atoms. Additionally homopolymers made from chloro substituted diene monomers having from 4 to 12 carbon atoms, and various copolymers made from cyano-substituted olefin monomers containing from 2 to 8 carbon atoms and diene monomers containing from 4 to 12 carbon atoms, may become rubber elastomers for layer 10.

In addition to the rubber elastomers, layer 10 may also have various antioxidants which contribute to its heat resistant properties. In a formulation prepared by the Malaysian National Rubber Bureau, it has been found that the zinc salt of 2-mercapto-4(5)-methylbenzimidazole provides oxidation resistance which resists heat for rubber layer 10. Therefore, rubber layer 10 should have about 1 part by weight of a salt of a benzimidazole having the following formula

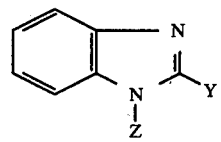

where Y is selected from the group of radicals consisting of hydrogen and mercapto and where Z is selected from the group of radicals consisting of hydrogen and alkyl radicals having from 1 to 6 carbon atoms. These compounds are commercially available from Mobay Chemical Corporation under the trade name of Vulcanox ZMB.

In addition to the rubber elastomer and the benzimidazole compound, the Malaysian Rubber Bureau formulation includes AgeRite resin D, manufactured by R. T. Vanderbuilt Co. This resin is polymerized 1, 2-dihydro-2,2,4-trimethylquinoline. The combination of the rubber elastomer, the benzimidazole compound and the AgeRite resin D contribute greatly to antioxidant properties which give good aging properties with limited effect on the modulus of the layer 10 during periods of constant exposure to elevated temperatures.

In addition to the rubber elastomer, the benzimidazole compound, and the quinoline compound, the formulation of the Malaysian Rubber Bureau includes about 3.2 parts of a compound having the following formula, which is the reaction product of a nitrosophenols and a di-isocyanate.

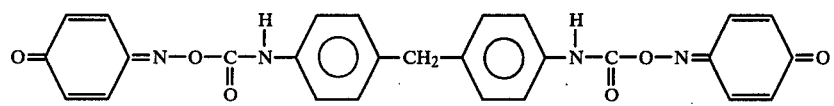

This material is commercially available from Durham Chemicals Limited under the trade name of Novor 924, and this compound serves as a vulcanizing agent providing a pseudo-urethane crosslinking for the compound comprising rubber layer 10.

Other materials included in the formulation by the Malaysian Rubber Bureau are about 0.90 parts by weight of 4,4 dithiodimorpholine, and about 0.10 parts by weight of N-tert-butyl-2-benzothiazolesulfenamide. The first compound is commercially available from the Monsanto Company under the trade name of Sulfasan R, and the latter is commercially available from the same company under the trade name Santocure NS. An additional material in the blend for rubber layer 10 is about 1.3 parts of tetramethylthiuram monosulfide.

As seen with reference to Table 3, there are several other materials in the rubber layer recipe of the Malaysian Rubber Bureau commonly used in rubber compounding.

TABLE III
RUBBER LAYER RECIPE MALAYSIAN RUBBER BUREAU

| COMPOUND | PARTS BY WEIGHT |
|---|---|
| Natural Rubber | 100 |
| (Number 1 Ribbed Smoke Sheet) | |
| Pepton | 0.20 |
| Zinc Oxide | 1.05 |
| Stearic Acid | .50 |
| AgeRite Resin D | 2.00 |
| Novor 924 | 3.20 |
| TMTM | 1.30 |
| Sulfasan R | 0.90 |
| Santocure NS | 0.10 |
| Vulkanox ZMB-Z | 1.00 |
| Circolite Oil | 1.85 |
| (a lightweight processing oil) | |

After mixing the ingredients in Table III for a period of about 30 minutes on a mill at a temperature from about 100° F. to about 180° F., the blend is calendared at a temperature from about 125° to about 180° F. to form a layer 10. This layer may have a varying thickness depending upon the thicknesses of the layers 15 and 20 in laminate 11 and the desired protection for the metal substrate 30. Typically, the layer 10 has a thickness of about 0.112 inches. Generally, it may be stated that the greater the thickness of the layer 10 to provide heat resistance for the entire laminate 11, the greater the overall resistance of laminate 11 to diffusion of moisture or other corrosive materials.

As stated above, layer 20 may be any soft rubber compound which permits maximum rubber-to-metal adhesion. However, it is desirable to use the rubber layer recipe described in Table III for layer 20 as well as layer 10. It has been found that this recipe of the Malaysian Rubber Bureau exhibits good rubber-to-metal adhesion necessary for laminate 11.

The properties of rubber layer 10 exhibit excellent sustained tensile strength and percentage elongation which benefits the overall laminate 11. As seen in Table IV, the tensile strength of layer 10 increases and the percentage elongation does not endure a percentage change greater than ten percent (10%).

TABLE IV

| Layer of Recipe in Table III | Standard Cure 10 mins. 320° F. | Cure for 70 Hrs. At 212° F. | Percent Change |
|---|---|---|---|
| | TENSILE STRENGTH (PSI) | | |
| 1st Reading | 2475 | 3275 | +32 |
| 2nd Reading | 2200 | 2825 | +28 |
| 3rd Reading | 2125 | 3225 | +52 |
| | % ELONGATION | | |
| 1st Reading | 680 | 650 | −4 |
| 2nd Reading | 670 | 640 | −4 |
| 3rd Reading | 650 | 690 | +6 |

While it may appear that the overall laminate 11 is improved by layer 10 having the recipe described in Table III, it has been found by the inventor that rubber liner 15 of the present invention controls the performance of the heat resistant layer 10 for the laminate 11. The rubber liner 15 must not cure beyond a durometer hardness of 75 on the Shore D Scale to prevent a significant loss in percentage elongation which will crack or fissure layer 10. It has been found by the inventor that, despite the excellent percentage elongation of layer 10, it is not capable of preventing a structural weakness when the same is first generated in the liner 15. Further, the diffusion resistance of the rubber liner 15 maintains its effectiveness over great periods of time at elevated temperatures, and layer 10 supplements the formulation of rubber liner 15 to slow the curing of liner 15, and never beyond a durometer hardness of 75 on the Shore D Scale. The combination of layers, one having the recipe of Table I and the other having the recipe of Table III combine to produce a laminate 11 having the unexpected properties of diffusion resistance maintained by heat resistant materials.

Whenever an anti-foaming agent such as kerosene is employed in the reaction processing, or when kerosene is employed in uranium ore floatation recovery methods, the laminate 11 may also have a layer 10 resistant to heat and the degrading effects of petroleum and its derivatives upon layers 10, 15, and 20. Such rubber elastomers as nitrile rubber and polychloroprene (neoprene) are particularly suitable for blending with the heat resistant formulation of the Malaysian Natural Rubber Bureau. It has been found a nitrile rubber having a composition found in Table V may be blended with the Malaysian Natural Rubber Bureau Formulation of Table III to provide protection against kerosene degradation against layer 10 while maintaining high temperature resistance, as seen in Table VI. The blend of heat resistant rubber and anti-foaming agent resistant rubber may be from 10 percent by weight/90 percent by weight anti-foamer resistant rubber/high temperature resistant rubber to 90 percent/10 percent anti-foamer resistant rubber/high temperature resistant rubber. Desirably, the blend may be from 30 percent/70 percent to 70 percent/30 percent anti-foamer resistant rubber/high temperature resistant rubber.

TABLE V
RESISTANT RUBBER OIL

| Compound | Parts By Weight |
|---|---|
| Nitrile Rubber | 100.00 |
| (Hycar 1052-30 by B. F. Goodrich) | |
| Carbon Black | 30.00 |
| (N 762 Black) | |
| Stearic Acid | 1.00 |
| Zinc Oxide | 5.00 |
| Dibutyl Pathalate Oil | 15.00 |
| (A Plasticizer) | |
| Sunolube 240 Wax | 0.50 |
| (Sun Oil Co.) | |
| AgeRite Resin D | 1.00 |
| AKROCHEM P 90 Resin | 5.00 |
| (phenol formaldehyde resin tactifier, Akron Chemical Co.) | |
| Santocure NS | 2.00 |
| Tetramethyl Thiuram Disulfide | 2.00 |
| Sulfasan R | 2.00 |

TABLE VI
50% BY WEIGHT OF RUBBER OF TABLE III/ 50% BY WEIGHT OF RUBBER OF TABLE V

| Sample | Standard Cure 10 minutes 320° F. | Cure for 70 Hrs. 212° F. | Percent Change |
|---|---|---|---|
| | TENSILE STRENGTH | | |
| 1st Reading | 2100 | 2250 | +7% |
| 2nd Reading | 2020 | 2300 | +13% |
| 3rd Reading | 2040 | 2250 | +10% |
| | % ELONGATION | | |

TABLE VI-continued

| | 50% BY WEIGHT OF RUBBER OF TABLE III/ 50% BY WEIGHT OF RUBBER OF TABLE V | | |
|---|---|---|---|
| Sample | Standard Cure 10 minutes 320° F. | Cure for 70 Hrs. 212° F. | Percent Change |
| 1st Reading | 600 | 600 | 0% |
| 2nd Reading | 600 | 620 | +3% |
| 3rd Reading | 630 | 630 | 0% |

It is apparent from an examination of Table VI that a blend of oil resistant rubber and heat resistant rubber have a durometer hardness of about 40 on the Shore A Scale, synergistically provides a maintained resistance to heat, as measured by tensile strength and percent elongation. Further, with nitrile rubber or neoprene rubber, the oil resistant rubber portion of the blend resists the degradation of laminate 11 from kerosene degradation. Comparison of Tables VI and IV demonstrates the addition of the blended oil resistant rubber does not affect the tensile strength or the percent elongation properties of the heat resistant rubber either alone or in combination with the oil resistant rubber.

In accordance with the Patent Statutes, the best mode for carrying out the invention has been provided. However, the invention is not to be limited thereto or thereby. Consequently, for an understanding of the scope of the invention, reference is had to the following claims.

What is claimed is:

1. A rubber liner resistant to fluid diffusion, comprising:
   a composition, having upon curing, a durometer hardness of from about 15 to about 75 on the Shore D Scale, said compositions comprising:
   (a) about 100 parts by weight of a rubber elastomer selected from the group consisting of (1) natural rubber, (2) a polymer made from diene monomers monomers having from 4 to 12 carbon atoms, (3) a copolymer made from diene monomers having from 4 to 12 carbon atoms, (4) a copolymer made from vinyl substituted aromatic monomers having from 8 to 12 carbon atoms and diene monomers having from 4 to 12 carbon atoms, (5) and combinations thereof; and
   (b) from 1 part to 4 parts by weight of a thiuram compound having the following formula:

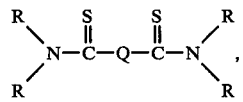

where R is hydrogen or alkyl group having from 1 to 6 carbon atoms and where Q is selected from the group of thio radicals consisting of —S—, —S—S—, and combinations thereof;
   whereby said composition resists structural cracking under continuous exposure to temperatures above about 180° F.

2. A rubber liner resistant to fluid diffusion, according to claim 1, wherein said composition further comprises about 5 parts to about 15 parts by weight of zinc oxide, wherein said composition further comprises from about 30 parts to about 60 parts by weight of sulfur, and wherein said composition comprises about 2 to about 4 parts by weight of said thiuram compound.

3. A rubber liner resistant to fluid diffusion, according to claim 2, wherein said sulfur comprises about 50 parts by weight; said zinc oxide comprises about 8 parts by weight; and wherein said thiuram compound comprises about 2.5 parts by weight.

4. A rubber liner resistant to fluid diffusion, according to claim 1, wherein said composition further comprises about 0.20 parts of a peptizing agent.

5. A rubber laminate resistant to heat and fluid diffusion, comprising:
   a heat resistant rubber layer and a diffusion-resistant rubber layer;
   said diffusion-resistant layer comprising a composition having, upon curing, a durometer hardness of from about 15 to about 75 on the Shore D Scale, said composition comprising
   (a) about 100 parts by weight of a rubber elastomer selected from the group consisting of (1) natural rubber, (2) a polymer made from diene monomers having from 4 to 12 carbon atoms, (3) a copolymer made from diene monomers having from 4 to 12 carbon atoms,
   (4) a copolymer made from vinyl substituted aromatic monomers having from 8 to 12 carbon atoms and diene monomers having from 4 to 12 carbon atoms and (5) combinations thereof (b) from about 1 part to about 4 parts by weight of a thiuram compound having the following formula:

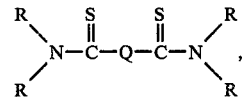

where R is hydrogen or an alkyl group having 1 to 6 carbon atoms and where Q is selected from the group of thioradicals thioradicals consisting of —S—, —S—S—, and combinations thereof;
   whereby said composition resists structural cracking under continuous exposure to temperatures above about 180° F.;
   said heat resistant layer comprising a blend having less then ten percent (10%) change in percentage elongation after exposure to temperatures of about 212° F. for periods greater than about 70 hours, said blend comprising
   (1) about 100 parts by weight of a rubber elastomer selected from the group consisting of (a) natural rubber, (b) a polymer made from diene monomers having from 4 to 12 carbon atoms, (c) a copolymer made from diene monomers having from 4 to 12 carbon atoms, and (d) a copolymer made from vinyl substituted aromatic monomers having from 8 to 12 carbon atoms and diene monomers having from 4 to 12 carbon atoms, (e) homopolymers made from chloro-substituted diene monomers having from 4 to 12 carbon atoms, (f) copolymers made from cyano-substituted olefin monomers having from 2 to 8 carbon atoms and diene monomers having from 4 to 12 carbon atoms; and
   (2) about 1 part by weight of a salt of a benzimidazole having the following formula:

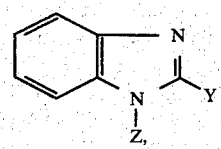

where Y is selected from the group of radicals consisting of hydrogen and mercapto and where Z is selected from the group of radicals consisting of hydrogen and alkyl groups having from 1 to 6 carbon atoms;

whereby said heat resistant layer resists oxidation at elevated temperatures over extended time periods to retain or increase its tensile strength.

6. A rubber laminate resistant to heat and fluid diffusion, according to claim 5, wherein said heat resistant layer further comprises about 2.0 parts by weight of 1,2-dihydro-2,2,4-trimethylquinoline.

7. A rubber laminate resistant to heat and fluid diffusion, according to claim 6, wherein said heat resistant layer further comprises:
about 0.90 parts by weight of 4,4 dithiodimorphioline,
about 0.10 parts by weight of N-tert-butyl-2-benzothiazolesulfenamide, and
about 3.20 parts by weight of the reaction product of a nitrosophenol and a di-isocyanate having the following formula:

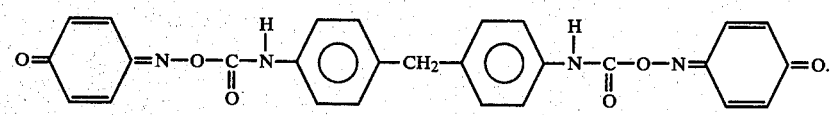

8. A rubber laminate resistant to heat and fluid diffusion, according to claim 7, wherein said heat resistant layer further comprises about 1.05 parts by weight of zinc oxide and about 1.30 parts by weight of a thiuram compound having the following formula:

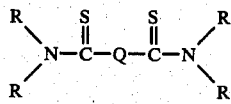

where R is hydrogen or an alkyl group having from 1 to 6 carbon atoms and where Q is selected from the group of thio radicals consisting of —S—, —S—S—, and combinations thereof.

9. A rubber laminate resistant to heat and fluid diffusion, according to claim 5, wherein the laminate further comprises a metal-adhesive rubber layer comprising about 100 parts by weight of a rubber elastomer.

10. A rubber laminate according to claim 9, wherein the metal-adhesive rubber layer rubber elastomer is selected from the group consisting of (a) natural rubber, (b) a polymer made from diene monomers having from 4 to 12 carbon atoms, (c) a copolymer made from diene monomers having from 4 to 12 carbon atoms, and (d) a copolymer made from vinyl substituted aromatic monomers having from 8 to 12 carbon atoms and diene monomers having from 4 to 12 carbon atoms; and wherein said metal-adhesive rubber layer further comprises about 1 part by weight of a salt of a benzimidazole having the following formula:

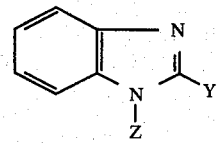

where Y is selected from the group of radicals consisting of hydrogen and mercapto and where Z is selected from the group of radicals consisting of hydrogen and alkyl groups having from 1 to 6 carbon atoms; and wherein said metal-adhesive rubber layer further comprises about 2.0 parts by weight of 1,2-dihydro-2,2,4-trimethylquinoline.

11. A rubber laminate resistant to heat and fluid diffusion, according to claim 10, wherein said metal-adhesive liner further comprises about 0.90 parts by weight of 4,4-dithiodimorpholine; about 0.10 parts by weight of N-tert-butyl-2-benzothiazolesulfenamide, and about 3.20 parts by weight of the reaction product of a nitrosophenol and a di-isocyanate having the following formula:

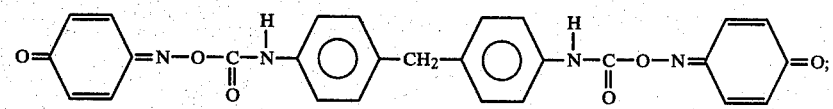

wherein said metal-adhesive rubber layer further comprises about 1.05 parts by weight of zinc oxide and about 1.30 parts by weight of a thiuram having the following formula:

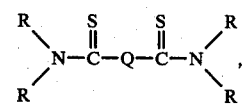

where R is hydrogen or an alkyl group having 1 to 6 carbon atoms and where Q is selected from the group of thioradicals consisting of —S—, —S—S—, and combinations thereof.

12. A rubber laminate resistant to heat and fluid diffusion, according to claim 5, wherein said heat resistant layer is blended with a oil-resistant rubber composition at a percentage from about 10/90 to about 90/10 by weight, such that said heat resistant layer resists degradation by oil compounds.

13. A rubber laminate resistant to heat and fluid diffusion, according to claim 12, wherein said oil-resistant composition is selected from the group consisting of poly chloroprene, nitrile rubber, and combinations thereof.

14. A rubber laminate resistant to heat and fluid diffusion, according to claim 13, wherein said oil-resistant composition is nitrile rubber and said oil-resistant composition is blended with said heat resistant layer at a percentage from about 30/70 to about 70/30 by weight.

15. A rubber liner resistant to fluid diffusion according to claim 1, 2, 3, or 4, wherein said thiuram compound is selected from the group consisting of tetramethyl thiuram monosulfide, tetramethyl thiuram disulfide, tetraethyl thiuram monosulfide, and tetraethyl thiuram disulfide, and wherein said rubber is selected from the group consisting of a polymer made from butadiene monomers or isoprene monomers, or a copolymer of styrene-butadiene rubber.

16. A rubber laminate resistant to heat and fluid diffusion, according to claim 5, 6, 7, or 8, wherein said thiuram is selected from the group consisting of tetramethyl thiuram monosulfide, tetramethyl thiuram disulfide, tetraethyl thiuram monosulfide, and tetraethyl thiuram disulfide, and wherein said rubber of said diffusion-resistant layer is selected from the group consisting of a polymer made from butadiene monomers or isoprene monomers, or a copolymer of styrene-butadiene.

17. A rubber laminate resistant to heat and fluid diffusion, according to claim 16, wherein said heat diffusion rubber is natural cis-1,4-polyisoprene.

18. A rubber laminate resistant to heat and fluid diffusion, according to claim 9, 10, or 11, wherein said thiuram compound is selected from the group consisting of tetramethyl thiuram monosulfide, tetramethyl thiuram disulfide, tetraethyl thiuram monosulfide, and tetraethyl thiuram disulfide, and wherein said heat-resistant rubber is selected from the group consisting of a polymer made from butadiene monomers or isoprene monomers, or a copolymer of styrene-butadiene rubber, and wherein said heat-resistant rubber and said metal adhesive rubber is natural rubber.

19. A rubber laminate resistant to heat and fluid diffusion according to claim 12, 13, or 14, wherein said thiuram compound is selected from the group consisting of tetramethyl thiuram monosulfide, tetramethyl thiuram disulfide, tetraethyl thiuram monosulfide, and tetraethyl thiuram disulfide, and wherein said heat-resistant rubber is selected from the group consisting of a polymer made from butadiene monomers or isoprene monomers, or a copolymer of styrene-butadiene.

* * * * *

UNITED STATES PATENT OFFICE
CERTIFICATE OF CORRECTION

Patent No. 4,339,506            Dated July 13, 1982

Inventor(s) Theodore O. Martin, Jr.

It is certified that error appears in the above-identified patent and that said Letters Patent are hereby corrected as shown below:

Column 11, lines 38 and 39, delete the first use of the word "monomers" so that the phrase reads "diene monomers having".

Column 12, line 41, delete the first use of the word "thioradicals" so that the phrase reads "group of thioradicals consisting".

Column 14, line 67, delete the space between "poly" and "chlorine" so that "polychloroprene" appears as one word.

Signed and Sealed this

Twelfth Day of October 1982

[SEAL]

Attest:

GERALD J. MOSSINGHOFF

Attesting Officer      Commissioner of Patents and Trademarks